(12) United States Patent
Webber et al.

(10) Patent No.: US 9,704,312 B2
(45) Date of Patent: *Jul. 11, 2017

(54) APPARATUS AND METHODS FOR IDENTITY VERIFICATION

(71) Applicant: CYLON GLOBAL TECHNOLOGY INC., Nassau, New Providence (BS)

(72) Inventors: Glenn Webber, Nassau (BS); Eamonn Courtney, Nassau (BS); Jacqueline Cole-Courtney, Nassau (BS)

(73) Assignee: CYLON GLOBAL TECHNOLOGY INC., Nassau (BS)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,269

(22) Filed: Apr. 29, 2016

(65) Prior Publication Data

US 2016/0247337 A1   Aug. 25, 2016

Related U.S. Application Data

(63) Continuation of application No. 14/262,217, filed on Apr. 25, 2014, now Pat. No. 9,330,511.

(51) Int. Cl.
*G05B 19/00* (2006.01)
*G05B 23/00* (2006.01)
(Continued)

(52) U.S. Cl.
CPC ......... *G07C 9/00087* (2013.01); *G06F 21/32* (2013.01); *G06F 21/42* (2013.01);
(Continued)

(58) Field of Classification Search
CPC ....................................................... H04L 9/32
See application file for complete search history.

(56) References Cited

U.S. PATENT DOCUMENTS

| 4,582,985 A | 4/1986 | Lofberg |
| 5,623,552 A | 4/1997 | Lane |

(Continued)

FOREIGN PATENT DOCUMENTS

| CN | 1403996 | 3/2003 |
| CN | 2562256 | 7/2003 |

(Continued)

OTHER PUBLICATIONS

Combined Search and Examination Report under Sections 17 and 18(3) dated Jan. 31, 2014, for United Kingdom Patent Application No. GB1315570.0, filed Aug. 30, 2013.

(Continued)

*Primary Examiner* — Joseph Feild
*Assistant Examiner* — Pameshanand Mahase
(74) *Attorney, Agent, or Firm* — Knobbe, Martens, Olson & Bear, LLP

(57) ABSTRACT

An identity verification device comprises a cellular telecommunications modem and a fingerprint scanner coupled to the modem, the verification device being configured for storing first fingerprint data in an enrolment process and being operable, in response to the modem receiving a verification command via a cellular telecommunications network, to perform a verification process in which the fingerprint scanner scans a fingerprint to obtain second fingerprint data, the first and second fingerprint data are compared with each other, and in the event of a match between the first and second fingerprint data, the modem transmits a response signal to a predetermined destination via the telecommunications network. The device may be used in a networked telecommunications system in which the electronic transactions may be initiated by smart cards and other devices.

7 Claims, 6 Drawing Sheets

(51) Int. Cl.

| | | |
|---|---|---|
| *G06F 7/00* | (2006.01) | |
| *G06F 21/00* | (2013.01) | |
| *G06K 9/00* | (2006.01) | |
| *G07C 9/00* | (2006.01) | |
| *G06F 21/32* | (2013.01) | |
| *G06F 21/42* | (2013.01) | |
| *G06K 7/10* | (2006.01) | |
| *H04L 9/08* | (2006.01) | |
| *H04W 12/06* | (2009.01) | |
| *H04W 12/04* | (2009.01) | |
| *H04L 29/06* | (2006.01) | |
| *H04W 4/12* | (2009.01) | |

(52) U.S. Cl.
CPC ..... *G06K 7/10297* (2013.01); *G06K 9/00087* (2013.01); *G06K 9/00926* (2013.01); *G07C 9/00039* (2013.01); *G07C 9/00111* (2013.01); *H04L 9/0816* (2013.01); *H04L 9/0866* (2013.01); *H04L 63/0861* (2013.01); *H04W 12/06* (2013.01); *G07C 2209/02* (2013.01); *H04L 63/083* (2013.01); *H04W 4/12* (2013.01); *H04W 12/04* (2013.01)

(56) References Cited

U.S. PATENT DOCUMENTS

| | | | |
|---|---|---|---|
| 5,847,553 | A | 12/1998 | Beaudoin et al. |
| 5,912,453 | A | 6/1999 | Gungl et al. |
| 6,012,636 | A | 1/2000 | Smith |
| 6,182,892 | B1 | 2/2001 | Angelo et al. |
| 6,325,285 | B1 | 12/2001 | Baratelli |
| 7,028,893 | B2 | 4/2006 | Goodman et al. |
| 7,044,368 | B1 | 5/2006 | Barron |
| 7,269,277 | B2 | 9/2007 | Davida et al. |
| 7,278,025 | B2 | 10/2007 | Saito et al. |
| 7,506,806 | B2 | 3/2009 | Bonalle et al. |
| 7,702,369 | B1 | 4/2010 | Wright |
| 7,711,152 | B1 | 5/2010 | Davida et al. |
| 7,715,593 | B1 | 5/2010 | Adams et al. |
| 7,819,329 | B2 | 10/2010 | Lu et al. |
| 7,841,539 | B2 | 11/2010 | Hewton |
| 8,052,052 | B1 | 11/2011 | Power |
| 8,078,538 | B1 | 12/2011 | Buch et al. |
| 8,665,062 | B2 | 3/2014 | Bragagnini et al. |
| 2003/0223624 | A1 | 12/2003 | Hamid |
| 2003/0226041 | A1 | 12/2003 | Palmer et al. |
| 2004/0260657 | A1 | 12/2004 | Cockerham |
| 2005/0044387 | A1 | 2/2005 | Ozolins |
| 2005/0194452 | A1 | 9/2005 | Nordentoft et al. |
| 2005/0240778 | A1 | 10/2005 | Saito |
| 2005/0244037 | A1 | 11/2005 | Chiu |
| 2006/0026108 | A1 | 2/2006 | Wilson et al. |
| 2006/0032905 | A1 | 2/2006 | Bear et al. |
| 2006/0091223 | A1 | 5/2006 | Zellner et al. |
| 2006/0149971 | A1 | 7/2006 | Kozlay |
| 2006/0213973 | A1 | 9/2006 | Chan et al. |
| 2007/0017136 | A1 | 1/2007 | Mosher, Jr. et al. |
| 2007/0079136 | A1* | 4/2007 | Vishik ................ G06Q 20/0855 713/186 |
| 2007/0124597 | A1* | 5/2007 | Bedingfield, Sr. ...... G06F 21/31 713/186 |
| 2007/0174206 | A1 | 7/2007 | Colella |
| 2007/0186115 | A1* | 8/2007 | Gao ....................... H04W 12/06 713/184 |
| 2007/0189581 | A1 | 8/2007 | Nordentoft et al. |
| 2007/0198436 | A1* | 8/2007 | Weiss ..................... G06F 21/32 705/75 |
| 2007/0209064 | A1 | 9/2007 | Qin |
| 2008/0072063 | A1 | 3/2008 | Takahashi et al. |
| 2008/0126260 | A1 | 5/2008 | Cox et al. |
| 2008/0223925 | A1 | 9/2008 | Saito et al. |
| 2008/0265017 | A1 | 10/2008 | West |
| 2009/0153297 | A1 | 6/2009 | Gardner |
| 2010/0138666 | A1 | 6/2010 | Adams |
| 2010/0220900 | A1 | 9/2010 | Orsley |
| 2011/0102141 | A1 | 5/2011 | Wu |
| 2011/0119182 | A1 | 5/2011 | Smolkin |
| 2011/0175702 | A1 | 7/2011 | Desnoyers |
| 2011/0240748 | A1 | 10/2011 | Doughty et al. |
| 2011/0263294 | A1 | 10/2011 | Kim |
| 2011/0295748 | A1 | 12/2011 | Woodriffe |
| 2011/0304428 | A1* | 12/2011 | Motoyama .......... G07C 9/00111 340/5.74 |
| 2012/0042369 | A1 | 2/2012 | Fan |
| 2012/0049309 | A1 | 3/2012 | Kiyomoto et al. |
| 2012/0088449 | A1 | 4/2012 | Norair |
| 2012/0106103 | A1 | 5/2012 | Nohra |
| 2012/0217811 | A1 | 8/2012 | Marien |
| 2013/0046693 | A1 | 2/2013 | Ayedun et al. |

FOREIGN PATENT DOCUMENTS

| | | |
|---|---|---|
| CN | 102222389 | 10/2011 |
| CN | 102420452 | 4/2012 |
| CN | 102545612 | 7/2012 |
| EP | 1071049 | 1/2001 |
| EP | 1204079 | 5/2002 |
| EP | 1326196 | 7/2003 |
| EP | 1 840 788 A2 | 10/2007 |
| EP | 2 560 122 A1 | 2/2013 |
| GB | 2243235 | 10/1991 |
| JP | 07250111 | 9/1995 |
| JP | 10-313366 | 11/1998 |
| JP | 2001217741 | 8/2001 |
| JP | 2002222407 | 8/2002 |
| JP | 2003162705 | 6/2003 |
| KR | 10-2006-0033418 | 4/2006 |
| WO | WO 98/11750 A2 | 3/1998 |
| WO | WO 03/007538 A1 | 1/2003 |
| WO | WO 2009/055303 | 4/2009 |
| WO | WO 2009/070339 | 6/2009 |

OTHER PUBLICATIONS

International Search Report and Written Opinion dated Dec. 17, 2014 for International Patent Application No. PCT/GB2014/000336 filed on Aug. 29, 2014.

International Search Report and Written Opinion dated Dec. 22, 2014 for International Patent Application No. PCT/GB2014/000335 filed on Aug. 29, 2014.

International Search Rep6rt and Written Opinion dated Jan. 30, 2015 for International Patent Application No. PCT/GB2014/000334 filed on Aug. 29, 2014.

\* cited by examiner

APPARATUS AND METHODS FOR IDENTITY VERIFICATION

CROSS-REFERENCE TO RELATED APPLICATIONS

This application is a continuation of U.S. patent application Ser. No. 14/262,217, filed Apr. 25, 2014, which claims priority to and the benefit of United Kingdom Patent Application No. 1315570.0 filed in the United Kingdom Intellectual Property Office on Aug. 30, 2013, the entire contents of which are incorporated herein by reference in their entirety.

FIELD OF THE INVENTION

This invention relates to apparatus, systems, devices and methods for identity verification.

BACKGROUND

There is need for a simple and efficient means of identifying users of electronic systems in order to reduce or minimise mis-use of those systems by unauthorised individuals.

For example, so-called identity theft and fraudulent use of credit cards or the like is increasing so that there is a need for a means for ensuring that the person involved in any particular transaction is in fact the authorised person and not a fraudulent imposter.

At the present time, attempts to meet this need involve individuals carrying out security processes such as entry of codewords and code phrases which have to be memorised. As the level of security that is needed increases, the processes which the individual has to carry out to verify his or her identity become more complex. The more complex these processes are, the more time they take to carry out and the more they are liable to fail, for example due to the individual being unable to remember the particular codes or phrases which need to be entered. This problem is particularly acute where a given individual utilises a number of different electronic systems and each system requires different procedures and/or formats of security codes, passwords or security phrases.

Further, access to buildings, other forms of property or particular areas or rooms in a given building is now commonly controlled electronically. One way of attempting to permit entry only by authorised individuals is the use of a tag, such as an RFID tag, which is carried by an authorised individual and which cooperates with a tag sensor for inputting a signal to unlock a door. Another, is to provide a keypad at or near the relevant door and, to unlock the door, a code which is intended to be known only to authorised individuals has to be entered by the keypad. However, unauthorised access can be obtained if such tags become lost or stolen or the code becomes known to unauthorised individuals.

SUMMARY OF THE INVENTION

In order to address this problem, the present invention provides a network system for performing electronic transactions or processes as defined in claim 1.

BRIEF DESCRIPTION OF THE DRAWINGS

The invention is described further by way of example with reference to the accompanying drawings, in which.

OVERVIEW

Figure 1:
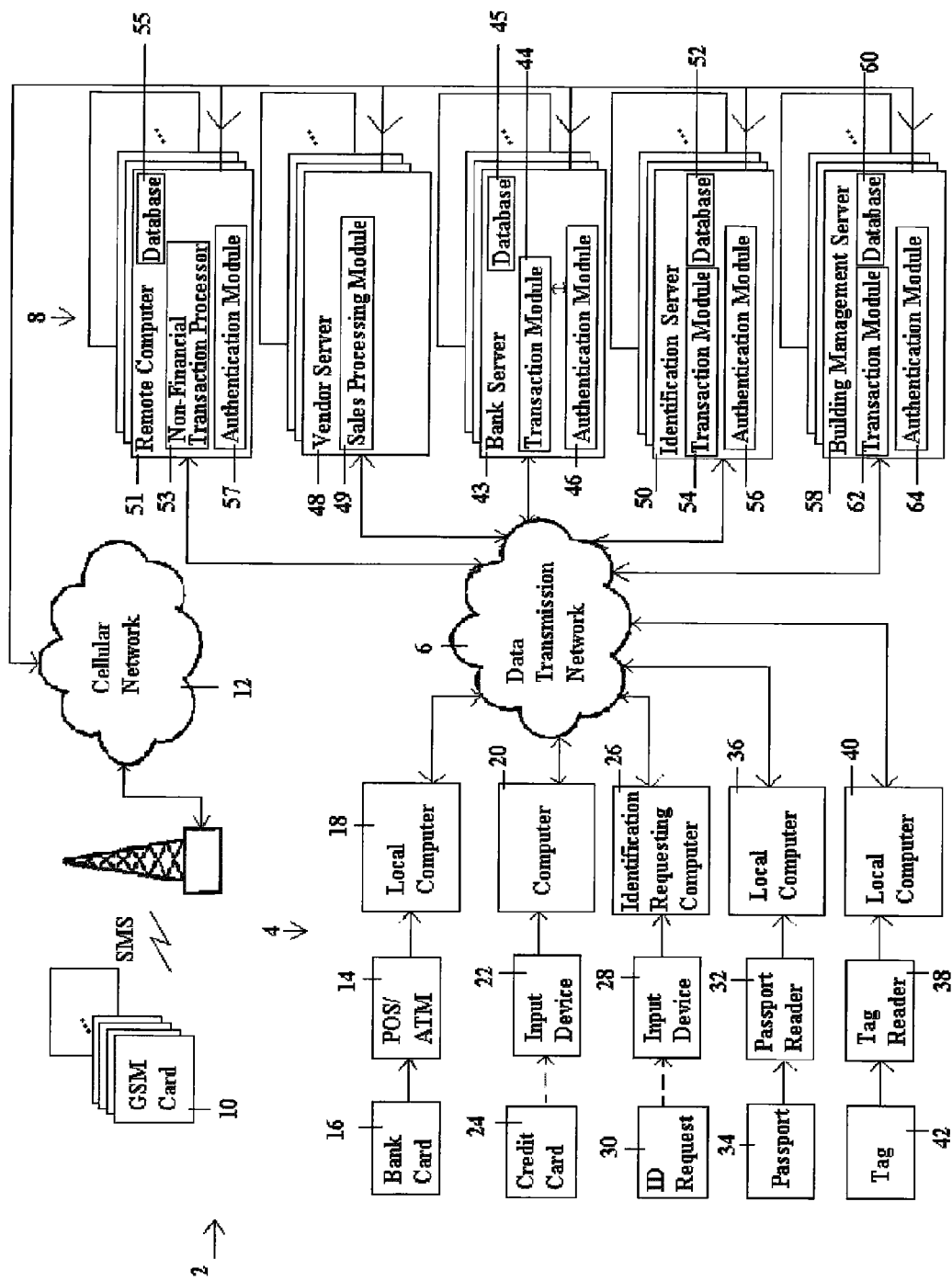
FIG. 1 is a block diagram of a system for performing electronic transactions according to a first embodiment of the invention.

FIG. 1 shows a system 2 for the performance of a multiplicity of electronic transactions. The electronic transactions may be of different types, including financial transactions, transactions providing access to buildings or areas by electronically controlled gates or barriers, transactions providing access to physical storage locations or rooms, transactions providing access to electronically stored data and transactions for turning on or off any kind of electrical or electrically controlled apparatus, machinery or system. The expression "electronic transactions" is therefore used broadly herein and includes any electronic or computer implemented event or process, particularly any event or process that may be initiated by, controlled by or authorised by, an individual.

The system 2 comprises a plurality of conventional terminal apparatus 4 for receiving data for instructing the transactions, a conventional data transmission network 6 for connecting the terminal apparatus 4 to appropriate ones of a plurality of servers 8 for executing the transactions, and a plurality of verification devices 10 which are registered in the system, in a manner to be described later, to respective individuals who may request or authorise the execution of transactions by the system 2. The servers 8 can communicate with the verification devices 10, via a conventional cellular telecommunications network 12, for verifying the identity of individuals instructing the transactions via the terminals 4. For this purpose, as will be described in more detail later, the verification devices 10 comprise fingerprint readers (not shown in FIG. 1).

Accordingly, the system 2 may comprise a large number of verification devices 10 and each individual whose identity is to be checked when instructing a transaction may be provided with a respective different one of those devices 10.

In practice, there may be a large number of different servers 8 and terminal apparatus 4 of a large number of different types for performing a wide range of different electronic transactions. In the system 2 illustrated in FIG. 1, there are five examples of different types of terminal apparatus 4, which cooperate with appropriate ones of the servers 8, for performing five different types of transaction.

First Example of Terminal Apparatus

In a first example, the terminal apparatus 4 comprises a conventional device 14 which cooperates with a conventional smart card 16, for example by insertion of the card 16 into the device 14, for instructing a financial transaction via a local computer 18. The device 14 is for example a point-of-sale device (POS) in a store or restaurant for purchasing goods or an automatic teller machine (ATM) for dispensing cash, and the smart card 16 is for example a credit card, bank card or debit card.

The card 16 may be constructed in accordance with the appropriate ISO/IEC standards, and comprise a substrate of specific structure and dimensions according to the standard, an integrated circuit comprising a microprocessor and appropriate memory storing data and programs, a circuit and contacts for connecting the card to a POS or ATM, a magnetic stripe storing data, and embossed and/or other alphanumeric characters identifying the person to whom the card is registered and the associated bank or other account. Instead of or in addition to electrical contacts, the card might be provided with means for wireless communication with a POS or ATM, particularly in accordance with relevant ISO/IEC standards.

The system may comprise a large number of smart cards 16 registered, in a conventional manner, in the system to the individuals, who may be referred to as cardholders, entitled to use them for the purchase of goods and services utilising bank or other accounts belonging to the individuals. Such accounts may, as is conventional, have credit limits applied to them.

As is also conventional, each smart card 16 stores a Personal Identity Number (PIN) and the device 14 is arranged to require input, typically by a keyboard, of the correct PIN before a transaction can be processed. Processing to check the PIN may be performed in a conventional manner by a processor incorporated into the smart card 16 or by a processor included in the POS or ATM.

The device 14 is connected to a conventional local computer 18 which transmits, in a conventional manner, a request for authorisation for the transaction to a bank server 43. In practice, the system 2 will include this is all in the conventional descriptions that is correct a number of different bank servers 43, as represented diagrammatically in FIG. 1, operated by or on behalf of different banks. The request for authorisation, accordingly, will be transmitted to the bank server 43 which corresponds to the particular smart card 16 that has been inserted into, or otherwise cooperates with, the device 14. Each bank server 43 includes a transaction module 44 for performing financial transactions and an authentication module 46 for performing authentication processes.

The transaction module 44 performs financial transactions in a conventional manner utilising a conventional card database 45 containing the details of the cards 16 and the respective individuals to whom they are registered. Before executing the financial transaction, the transaction module 44 sends a command or instruction to the authentication module 46 to cause it to verify the identity of the individual requesting the transaction, by performing an authentication process. This process utilises the verification device 10 that is registered to the registered holder of the card 16 that has been inserted in, or otherwise cooperates with, device 14. The authentication process will be described in detail later.

If the result of the authentication process is negative the transaction is not executed and a message confirming this is sent back to the local computer 18 in a conventional manner, as in situations in which the transaction is refused for other reasons, such as an inadequate credit balance on the relevant account. If the result of the authentication process is positive, the transaction module will, subject to any other conditions such as sufficient credit in the account, execute the transaction and the bank server 43 will send a message confirming this back to the local computer 18 in a conventional manner.

Although in the above description, the server 43 which executes the financial transaction has been described as a "bank" server, in many cases the transaction may be performed by the server or servers of a different type of financial institution, such as a company providing credit card services.

Second Example of Terminal Apparatus

The second example of the terminal apparatus 4 shown in FIG. 1 comprises a conventional personal computer 20 of any type having an input device 22, such as a keyboard and mouse or touch screen, operable for purchasing goods or services via the Internet by entering, using the input device 22, details of a conventional credit, debit or other financial card 24. The card 24 may be of identical structure and function to the card 16 as described above, but in this example data on the card, such as the identity of the cardholder, the number of the account to which the card relates and a security code, is entered manually into personal computer 20 rather than being read from the card as in the first example above. Typically, such details may be entered into appropriate fields of a webpage downloaded to the computer 20.

Following entry into the personal computer 20 of the details of the item or service to be purchased, the card data and a command to execute the transaction, the personal computer 20 communicates the details of the required transaction to a vendor server 48 which is operated by the vendor of the goods or services in question. The vendor server 48 comprises a sales processing module 49 which performs, in a conventional manner, the electronic processes necessary for executing the sale of the goods or services that the user wishes to purchase. However, before the sale is authorised the sales processing module 49 sends, via the data transmission network 6, a message to the appropriate bank (or other financial institution) server 43 to obtain payment for the purchase from the account to which the card 24 relates.

As in the first example described above, before the bank server 43 executes the financial transaction necessary to make the payment, the transaction module 44 of the bank server 43 requests the authentication module 46 of the bank server 43 to perform an authentication process, as referred to in the first example above, in which the identity of the individual making the purchase is verified utilising the verification device 10 registered to the relevant individual. As already noted, the details of the authentication process will be described later.

The computer 20 may also be used for effecting non-financial electronic transactions at a remote computer 51 of which, in practice, the system will comprise a number. Examples of such non-financial transactions include updating data, such as personal details, downloading or accessing data or documents from the remote computer or adding new data or documents to the remote computer. Such transactions would not require the use of the credit card 24, or other financial card, but may require the individual requesting the transaction to enter appropriate data, such as a username and/or password. Further, the data that is required to be input might be, or might include, the user's membership number in an organisation to which the user belongs and to which the proposed transaction relates. Such an organisation might be a professional body, a club or a customer loyalty scheme. Further, the non-financial transaction might simply be the process of logging on to the remote computer 51. In yet another example, the computer 20 might be arranged so that logging on to it is controlled by the remote computer 51, in which case the non-financial transaction performed by the remote computer 51 would be to respond to log on request from the computer 20 by the transmission to the computer 20 of a command or signal authorising or prohibiting logging on to the computer 20.

Thus, the remote computers 51 may be of a wide variety of different types for performing a wide variety of different processes, and may include servers of particular organisations and remote personal computers belonging to or assigned to the user of the computer 20. For example, the remote computer 51 might be an office computer or might be an email server to which the user requires access from his/her home computer or from some other computer such as a publicly accessible computer in an Internet cafe. Thus, the computer 20 might also be any of a variety of different types of computer located in any of a variety of locations.

As shown in FIG. 1, the computer 51 has a conventional non-financial transaction processor 53 for effecting the electronic transactions in question and a conventional database 55 containing details, such as a username or usernames and/or passwords and/or membership numbers etc, of individuals entitled to request the non-financial transactions that the remote computer 51 is operable to perform. In addition, the remote computer 51 includes an authentication module 57.

For the performance of a transaction at the remote computer 51, the user enters the required data into computer 20 via input device 22 and the computer 20, in response to the entry of an appropriate command, transmits a message via network 6 to the remote computer 51 for instructing the remote computer 51 to perform the requested transaction. Prior to executing the transaction, the processor 53 sends a request to the authentication module 57 which performs an authentication process which is the same as that performed by the authentication module 46 previously referred to and which (as previously indicated) will be described in detail later. If the result of the authentication is positive the transaction is executed by a processor 53 and if not the transaction is not executed and a message to this effect is transmitted back to the computer 20.

Third Example of Terminal Apparatus

The third example of the terminal apparatus 4 comprises a conventional computer 26, having an input device 28, such as a keyboard and mouse, used by an organisation, such as a government office, hospital or other institution which provides services or benefits to individuals and which requires verification of the identity of the individual before dispensing the services or benefits.

In use, the operator of the computer 26 manually enters, via the device 28, an identification request, represented by block 30, which will include data identifying the individual requesting the benefits or services.

In response to this, the computer 26 sends a message to an identification server 50. The server 50 stores a database 52 containing the identities of individuals having the right to receive the benefits or services in question and comprises a transaction module 54 which, upon receipt of the request, activates an authentication module 56, which in turn carries out an authentication process the same to that referred to above in connection with the first example. If the identity of the individual requesting the benefit or service is verified in the authentication process, then the operator of the computer 26 may take the steps necessary to dispense it. If the identity is not verified, then the operator may refuse to provide the service or benefit.

This example accordingly does not involve the use of a smartcard or other card, such as cards 16 and 24, in addition to the verification device 10.

In this example, the benefits or services to be provided may be any of a wide variety of different forms including, for example simple access to a building or a room in a building, or a secure area, in which case the operator of the computer 26 might be, for example, a security guard. Further, the service required might be access to electronically stored data, in which case the operator of the computer 26 might be the individual him/herself requiring the access, for example by means of a publicly available computer terminal constituting the computer 26 such as in an Internet cafe.

Thus, in this example, the transaction performed by the server 50 may be simply the generation and transmission to the computer 26 of a signal or data confirming or denying the identity whose verification has been requested.

Fourth Example of Terminal Apparatus

The fourth example shown in FIG. 1 of terminal apparatus 4 comprises a passport reader 32 which is operable for electronically reading a passport 34 and is connected to a local computer 36 for processing the data read from the passport 34. The passport reader 32 and local computer 36 may, for example, be located at an airport or other port.

Following the reading of the passport 34, the local computer 36 may, similarly to the local computer 26, send a message to one of the servers 50 requesting verification of the identity of the person who has presented the passport 34. In this example, the database 52 will be a database of passports and the identities of the respective passport holders. Apart from the fact that in this example identification data is read from the passport 34 by the passport reader 32 and thereby entered automatically into the local computer 36, this example functions in the same way as the third example described above.

Fifth Example of Terminal Apparatus

The fifth example of terminal apparatus 4 shown in FIG. 1 comprises a building access tag reader 38 connected to a local computer 40 for providing access, for example by unlocking a door, in response to the reading by the tag reader 38 of a tag 42. The tag 42 is of conventional type, such as a Radio Frequency Identity (RFID) tag, issued to individuals to give them access to premises, such as an office building or factory, by electrically unlocking a door upon presentation of the tag to the tag reader.

Before providing access, the local computer 40 sends a message to a building management server 58 which includes a database 60 of persons authorised to enter the building, a transaction module 62 which processes the request received from the local computer 40 and an authentication module 64 which similarly to the authentication module 46, is operable to verify the identity of the person presenting the tag 42 utilising the appropriate one of the verification devices 10, before access to the building is provided. The system may be such that each individual tag 42 has an identification number, the tags being registered, in the database 60, to respective different individuals to whom respective different verification devices 10 are registered. In this case, access may be given only if the authentication process determines that the verification device 10 with which the authentication process is performed is registered to the same individual as the tag 42 presented to the tag reader.

Although, in this example, the tag has been described as for giving access to premises, it could alternatively or additionally be a tag for turning off an alarm system upon entering a building or secure area, in which case the system would not turn off the alarm unless the identification process confirms that both the tag presented to the tag reader and the verification devices 10 used in the authentication process which is initiated are registered to the same individual.

Overview of Verification Devices

Figure 2:
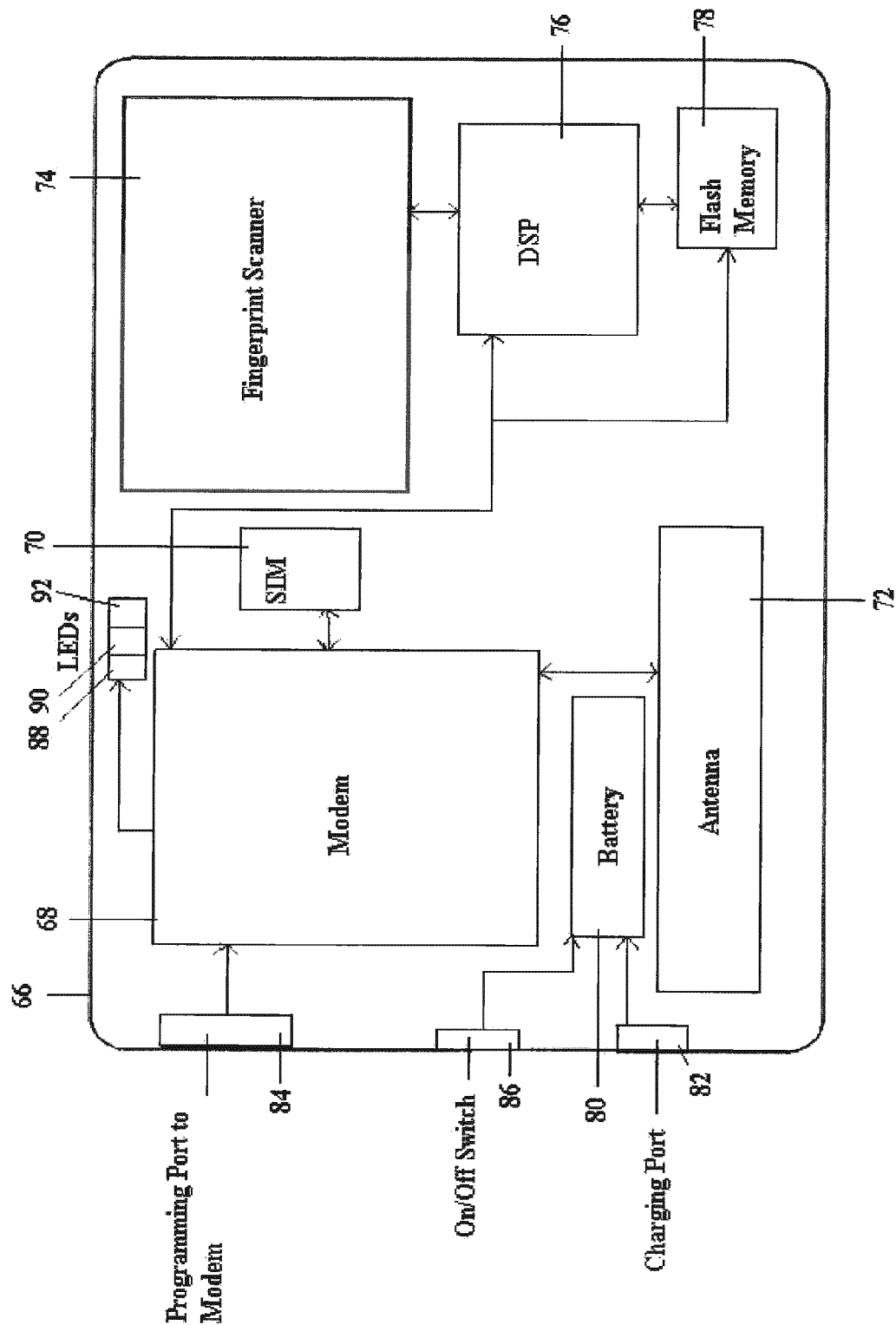
FIG. 2 is a block diagram of the main components of a verification device which is included in the system of FIG. 1 and is constructed in the form of a card incorporating a fingerprint reader.

As shown in FIG. 2, each of the verification devices 10 comprises a rectangular substrate 66, in the form of a card, upon which are mounted a mobile telephone (cellphone) modem 68 and an associated subscriber identity module (SIM) 70 and antenna 72, a fingerprint scanner 74, a digital signal processor 76, a flash memory unit 78, and a rechargeable battery 80 for powering the modem 68, SIM card 70, fingerprint scanner 74, digital signal processor 76 and flash memory unit 78. As is conventional, each SIM 70 has a unique telephone number.

A charging port 82, constituted by a conventional electrical connector, is mounted on the substrate 66 at one end thereof and connected to the battery 80 for connecting the battery to a power source, such as rectified mains, for charging the battery. A programming port 84 also in the form of an electrical connector, is also mounted on the substrate 66 at one end thereof and connected to the modem for supplying to the modem computer executable code for programming it, in particular for loading into the modem computer executable instructions which program the modem for the performance of verification processes.

The substrate 66 also supports a manually operable on/off switch 86 for connecting the battery to, and disconnecting it from, the components that it powers, and three light sources, preferably light emitting diodes (LEDs), 88, 90 and 92 for indicating respectively three different statuses of the device. Thus, LED 88 may be illuminated to indicate that a process requiring the reading of the fingerprint is to take place and the user of the card should therefore place his/her appropriate finger on the fingerprint scanner 74. The LED 90 may be illuminated to indicate that the process has been successful and the LED 92 may be illuminated to indicate that the process has been unsuccessful. Preferably, the LEDs 88, 90 and 92 are of different colours, which are preferably blue, green and red respectively.

The substrate 66 and the components 68 to 92 mounted on it are preferably constructed and arranged so that the dimensions and shape of the device 10 as a whole are such that it can be readily carried in a wallet along with conventional credit cards. Preferably, the dimensions and shape are as close as practicable to the size and shape of a conventional credit card. By way of example, the dimensions of the device 10 (i.e. the substrate 66 together with the components 68 to 92) may be approximately, for example, 85 mm×54 mm×3.5 mm. Other dimensions are possible. To achieve these dimensions, all of the components supported on the substrate may be constructed to be as flat (thin) as possible or practicable i.e. the dimensions of each component in a direction normal to the plane of the substrate 66 should be as small as possible or practicable and they should be positioned and arranged on the substrate 66 so as to achieve the required overall thickness of the device 10. For this purpose, cut-outs may be provided in the substrate 66 to accommodate some or all of the components as appropriate and practical.

The substrate may be constructed of material conventionally used for credit cards and the like, for example a suitable synthetic plastics material.

The function of each device 10 is to receive from the authentication modules 46, 56, 57 and 64, via the cellular network 12, SMS messages containing any one of a small number of device commands, to execute the received device command and, when required, to send data back to the relevant authentication module by means of a return SMS message. There may be four such commands, each of which may be in abbreviated form in the SMS message, as follows:

| | | |
|---|---|---|
| "identify user" | abbreviated to | "idu" |
| "enrol user" | abbreviated to | "enr" |
| "remove user" | abbreviated to | "reu" |
| "create database" | abbreviated to | "crd" |

It will be understood that the above abbreviations are merely by way of example and any suitable form of coding for the commands can be used.

The identify user command is used in the authentication process. The enrol command is used when setting up a card for use with a particular user and the remove user command is used for deleting data relating to a previously enrolled user from the card. The create database command is used for entering data into a database on the card in such a way that, as will be described in more detail later, a number of different sets of data may be stored on the card, for example each set being related to a respective different matter or item, such as a different credit, bank or other card or a different vendor or institution. Thus, a single one of the devices 10 registered to a single individual may be set up for verifying the identity of the individual in connection with a number of different transactions such as those described above with reference to the servers 8.

Further details of the components of the device 10 will be described later, following description of the authentication modules 46, 56, 57 and 64.

Authentication Modules

Figure 3:
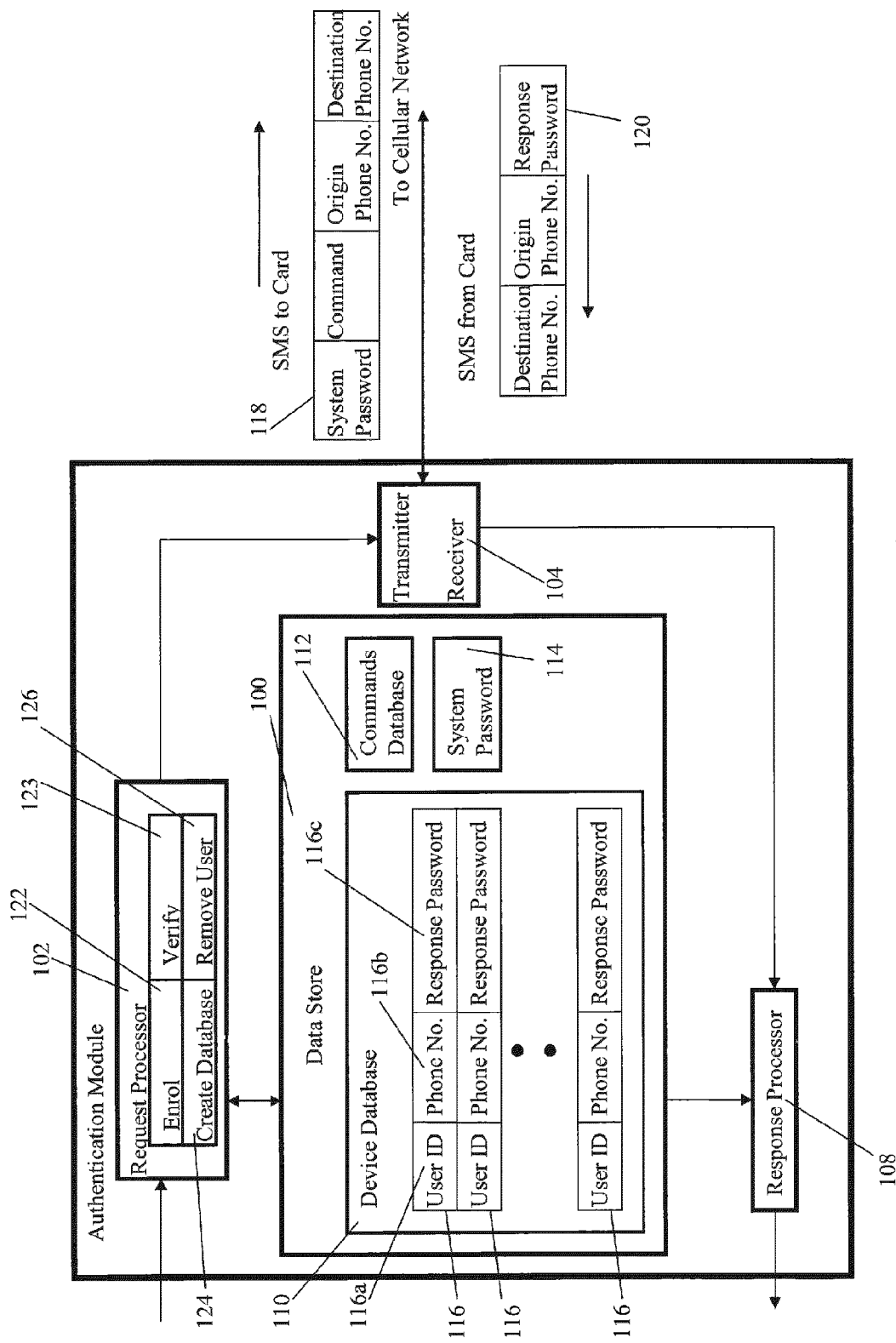
FIG. 3 is a block diagram of an authentication module included in the system of FIG. 1.

The authentication modules 46, 56, 57 and 64 are each as illustrated in FIG. 3.

As shown in this figure, these authentication modules each comprise a data store 100, a request processor 102 for processing requests received by the authentication module, a transmitter/receiver 104 which is operable for transmitting and receiving SMS messages, and a response processor 108 for processing each received SMS message. Accordingly, each authentication module has, by way of its transmitter/receiver 104, a unique telephone number.

The data store 100 contains a verification device database 110, a command database 112, and a system password store 114.

The request processor 102 comprises an enrolment module 122 for processing requests for enrolling the devices 10, a verify module 123 for processing verification requests received from the transaction modules, a create database module 124 for transmitting, in response to an appropriate request, data to be stored in a database on a verification device and a remove user module 126 for deleting users from the system in accordance with an appropriate request.

Verification Device Database

The verification device database 110 contains a plurality of records 116, only a few of which are shown.

Each record 116 corresponds to a respective different one of the verification devices 10 and has a field 116a storing data (user ID) identifying or relating to the person to whom the corresponding verification device 10 is registered, a field 116b storing the telephone number of the SIM 70 of the corresponding verification device 10 and a field 116c storing a response password which, as will be described more fully later, is also stored on the corresponding verification device 10 and is used in the authentication process.

The same device 10 may be registered in each of a number of different authentication modules so that it can be used in a verification process in relation to a number of different types of transaction. In this case, the record 116 which relates to the same device 10 in each of a number of different authentication modules will have the same phone number stored in field 116*b*. However, the response password stored for that device in field 116*c* in each different authentication module does not have to be the same although optionally it can be. Similarly, although most conveniently it may be that the user ID should be the same in the field 116*a* in each authentication module in which the particular device 10 is registered, this is not essential.

Command Database

The command database 112 stores the device commands, referred to above, which are to be transmitted to the verification devices 10. Thus, assuming the same abbreviated commands as set out above, the command database will contain four fields each storing a respective one of the commands:

"idu"
"enr"
"reu"
"crd"

As will be clear, these commands are for causing the verification device 10 to execute the respective processes "identify user", "enrol user", "remove user" and "create database". It is the first of these which is used in the authentication process.

System Passwords

The password which is stored in the system password store 114 may be the same in all of the authentication modules 46, 56 and 62. In that case, there will be a single, overall system password.

Alternatively, if different banks, vendors or other institutions require different passwords from each other, respective different passwords may be stored in the system password stores 114 of respective different authentication modules 46, 56 and 64. In that case, there will be a system password unique to each such institution.

Further, some groups of institutions may wish to share a common system password whilst other groups share a different system password and yet other institutions may wish to have their own unique system passwords. This can easily be achieved by storing a respective group system password in the stores 114 of the authentication modules of each respective group of institutions wishing to share a password (each different group thereby having a respective unique group system password), whilst storing a respective different unique system password in the store 114 of the authentication module of each institution requiring a unique system password.

The way in which the system passwords are used in the verification process will be described later.

Verification Request Module

The verification request module 123 is operable in response to reception by the request processor 102 of authentication requests from the respective transaction module 44, 53, or 54 to 62. Each authentication request will include a user ID that, for example, uniquely relates to the card 16 or 24, passport 34 or tag 42 used to initiate the requested transaction or, in the cases of the remote computer 51 and the identification server 50, uniquely relates to the purported identity of the person making the identification request 30.

Upon receipt of an authentication request, the verification request module 123 searches the fields 116*a* of the device database 110 to locate the record 116 corresponding to the user ID contained in the received verification request.

Having located any such record, the verification module 123 extracts the verification device phone number contained in field 116*b* of that record, the identify user (idu) command from the commands database 112 and the system password from the store 114 and forwards them to the transmitter/receiver 104 together with a command to cause the transmitter/receiver 104 to construct and transmit an SMS message.

SMS Messages

In response to the instruction referred to above, the transmitter/receiver 104 constructs an SMS message 118. The SMS message 118 contains as its destination phone number, the number extracted from the field 116*b* and as its origin phone number, the unique phone number of the transmitter/receiver 104. It also contains, as text, both the command "idu" and the system password. These may be separated from each other by a suitable separator symbol. The processes performed for constructing the SMS message are conventional and therefore need not be described.

Having constructed the SMS message 118, the transmitter/receiver 104 transmits it to the cellular network 12, either directly or via some other network such as network 6, and in a conventional manner the cellular network delivers the SMS message 118 to the modem 68 whose SIM 70 corresponds to the destination phone number in the SMS message.

In response to receiving the SMS message 118, the modem 68 and digital signal processor 76 execute processes (to be described in detail later) which, dependent upon the outcome of those processes, result in a return SMS message 120 (FIG. 3) being transmitted from the device 10 back to the authentication module from which the SMS message 118 originated. Thus, the return SMS message 120 contains, as the destination phone number, the unique phone number of the transmitter/receiver 104 from which the received SMS message 118 originated and, as the origin phone number, the phone number of the SIM 70 of the modem 68 which received the SMS message 118. The return SMS message 120 also contains, as text, a response password which is stored in the device 10, as will be described more fully later.

The transmitter/receiver 104 that receives the return SMS message 120 forwards the return SMS message to the response processor 108.

Response Processor 108

The response processor 108, upon receipt of the return SMS message 120, searches the device database 110 for a record 116 whose fields 116*b* and 116*c* respectively contain a phone number and response password corresponding to the origin phone number and response password contained in the return SMS message 120. If such a record is found, the response processor 108 transmits a message to the respective transaction module 44, 53, 54 or 62 indicating that the verification process has given a positive result. In response to this, the transaction module executes the requested transaction.

In the event that the search of the device database 110 performed by the response processor 108 does not locate a record 116 in which both phone number in field 116*b* and the response password in field 116*c* match the origin phone number and the response password in the return SMS message 120, the response processor 108 transmits a message to the respective transaction module indicating that the verification process has failed. In this case, the transaction processor does not execute the requested transaction.

Similarly, if the response processor 108 does not receive a return SMS message within a predetermined period of time following the transmission of the outgoing SMS message 118, the response processor 108 transmits a message to the respective transaction module indicating that the verification process has failed.

Enrolment Processor

The enrolment processor 122 is operable to execute an enrolment process in which relevant data relating to a new user are supplied to, and stored in, the authentication module and a verification device 10 assigned to the new user.

The enrolment processor 122 operates in response to enrolment requests, entered into the system in any suitable manner, for example by the manual entry of the data required for enrolment into a terminal (not shown). Alternatively, some or all of the required data may be incorporated automatically into an enrolment request for example using data in the databases 45, 52, 55 or 60 as appropriate. The enrolment request includes the user ID, the phone number of the SIM 70 of the device 10 assigned to him/her and a response password which may be randomly or otherwise selected.

In response to an enrolment request, the enrolment processor 122 creates, in the device database 110, a new record 116 and inserts the user ID, phone number and response password in the respective fields 116a, 116b and 116c thereof. The enrolment processor 122 also transfers this data to the transmitter/receiver 104 together with the system password extracted from store 114 and the enrolment command "enr" extracted from the command database 112. In response, transmitter/receiver 104 constructs an SMS message 118 in which the destination phone number is the phone number contained in the enrolment request and the enrolment command, system password and response password are included as text, with appropriate separators between them if required. The SMS message 118 is then transmitted, directly or via some other network, to the cellular network 12.

Upon receipt of the SMS message 118 containing the enrolment command, the device 70 carries out an enrolment process which will be described later.

Database Creation Processor

As will be described later, each of the verification devices is programmed for storing data of a number of different types in respective different memory blocks. The create database processor 124 included in the request processor 102 of each authentication module is operable for processing database creation requests entered into the system in any suitable manner as described with reference to the entry of enrolment requests. The database creation request includes the user ID corresponding to the device 10 on which the database is to be created, the identity of the memory block in which it is to be stored in the device 10 and the data that is to be stored.

In response to receiving a database creation request, the processor 124 searches the device database 110 to find the record 116 corresponding to the user ID in the database creation request and transfers, to the transmitter/receiver 104, the phone number from the field 116b of the located record together with the create database command "crd" extracted from the command database 112, the system password extracted from store 114 and the data that is to be transferred to the device 10. In response to this, the transmitter/receiver 104 constructs an SMS message 118 in which the destination phone number is the phone number transferred to it by the create database processor 124 and in which the create database command, the system password and the data in the create database request are contained as text, again with separators as required.

If necessary, due to the amount of data to be transferred, the transmitter/receiver 104 may split up the data into segments which are transmitted in separate SMS messages.

The way in which the data is stored in the device 10 will be described later. After storage of the data in the device 10, the device 10 may send a return SMS message (not shown) to the relevant authentication module and the response processor 108 thereof may then output data indicating that enrolment has taken place.

User Removal Processor

The remove user processor 126 which is operable to perform a process in which details of the previously enrolled user, and data relating to that user, are removed from the authentication module and from the device 10 corresponding to that user.

A remove user request includes the user ID and in response to the request, the processor 126 searches the device database 110 for the corresponding record 116, extracts the phone number from the field 116b thereof and transfers that phone number to the transmitter/receiver 104 together with the remove user command "reu" extracted from the command database 112 and the system password extracted from the store 114.

The transmitter/receiver 104 constructs an SMS message 118 in which the phone number extracted from device database 110 is the destination phone number and the remove user command and system password are contained as text, if desired or necessary, separated by an appropriate separator character. The SMS message 118 is then transmitted to the cellular network 12 directly or via another network.

Upon receipt of the SMS message, the device 10 removes all data relating to the user and sends a return SMS message (not shown) to the authentication module in question. The response processor 108, upon receipt of this return SMS message, deletes the relevant record 116 and may output data indicating that the user has been deleted.

Modem

Figure 4:
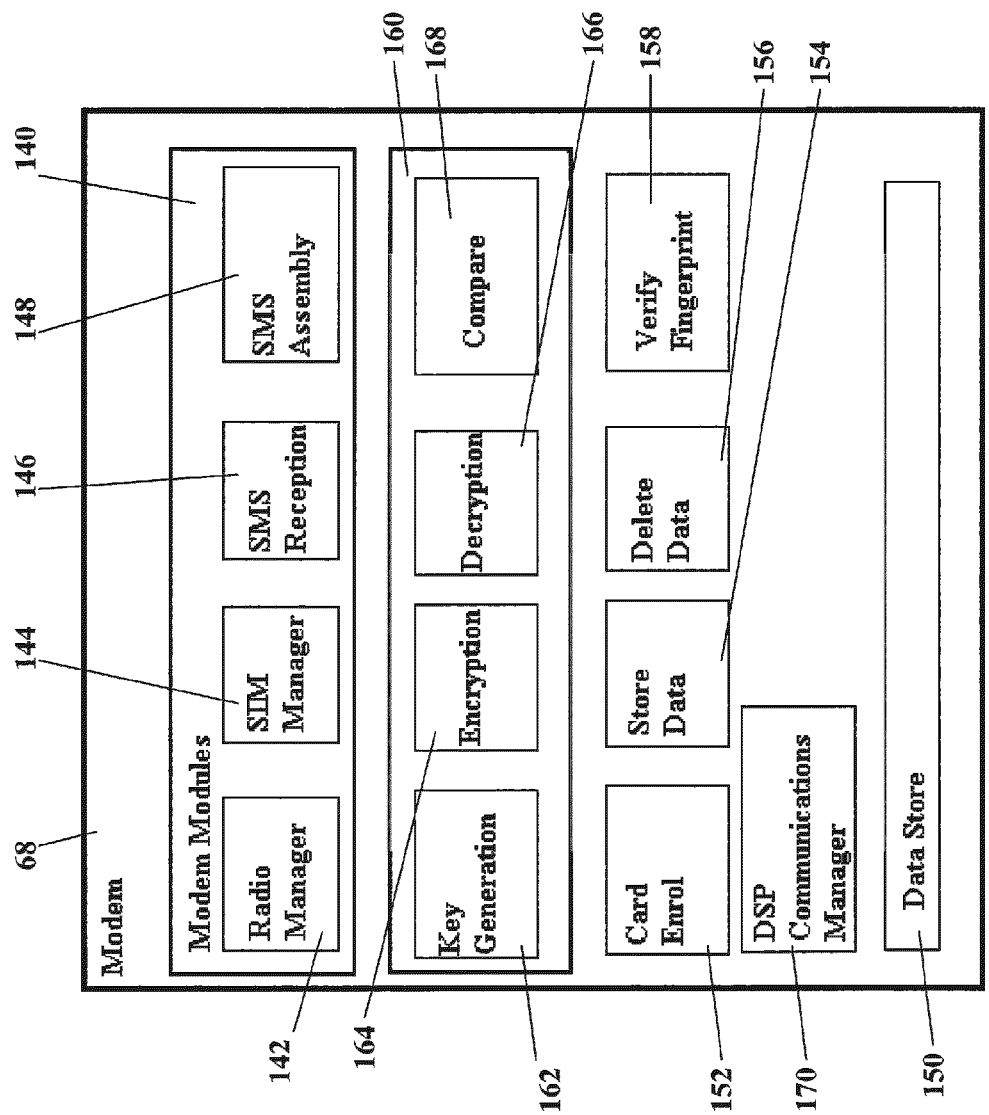
FIG. 4 is a block diagram showing the main components, as relevant to this embodiment, of a GSM modem provided on the card of FIG. 2.

The modem 68, which is shown in more detail in FIG. 4, is of conventional construction, but modified to include additional functionality to enable the modem 68, fingerprint scanner 74 and DSP 76 to execute the processes required in this embodiment of the invention.

Thus, FIG. 4 indicates at 140 a number of the conventional modules included in the GSM or cell phone modems, in particular a radio manager 142 for managing incoming and outgoing radio signals from and to the cellphone network 6, a SIM manager 144 for managing communications between the modem 68 and the SIM card 70, an SMS reception module 146 for processing incoming SMS messages and an SMS assembly module 148 for assembling and processing outgoing SMS messages. In practice, the modem 68 will include a large number of other conventional circuits and control modules, which may comprise software firmware or hardwired circuitry, but it is not necessary to describe these for the purpose of understanding the present embodiment of the invention.

To provide the functionality required by this embodiment of the invention, the modem 68 is configured to provide a data store 150 (illustrated in detail in FIG. 5) for storing data relating to users of the device 10, a set of control modules 152, 154, 156 and 158 each for responding to a respective one of the commands received by the modem from the authentication modules, and an encrypted data handler 160. The encrypted data handler 160 comprises an encryption key generator 162 for generating encryption keys in a manner which will be described later, an encryptor 164 for encrypting data using those keys, a decryptor 166 for decrypting the data so encrypted and a comparator 168 for performing comparison operations on encrypted data as will be described later.

A DSP communications manager 170 controls communication between the modem 68 and the digital signal processor 76.

Modem Data Store and Flash Memory

Figure 5:
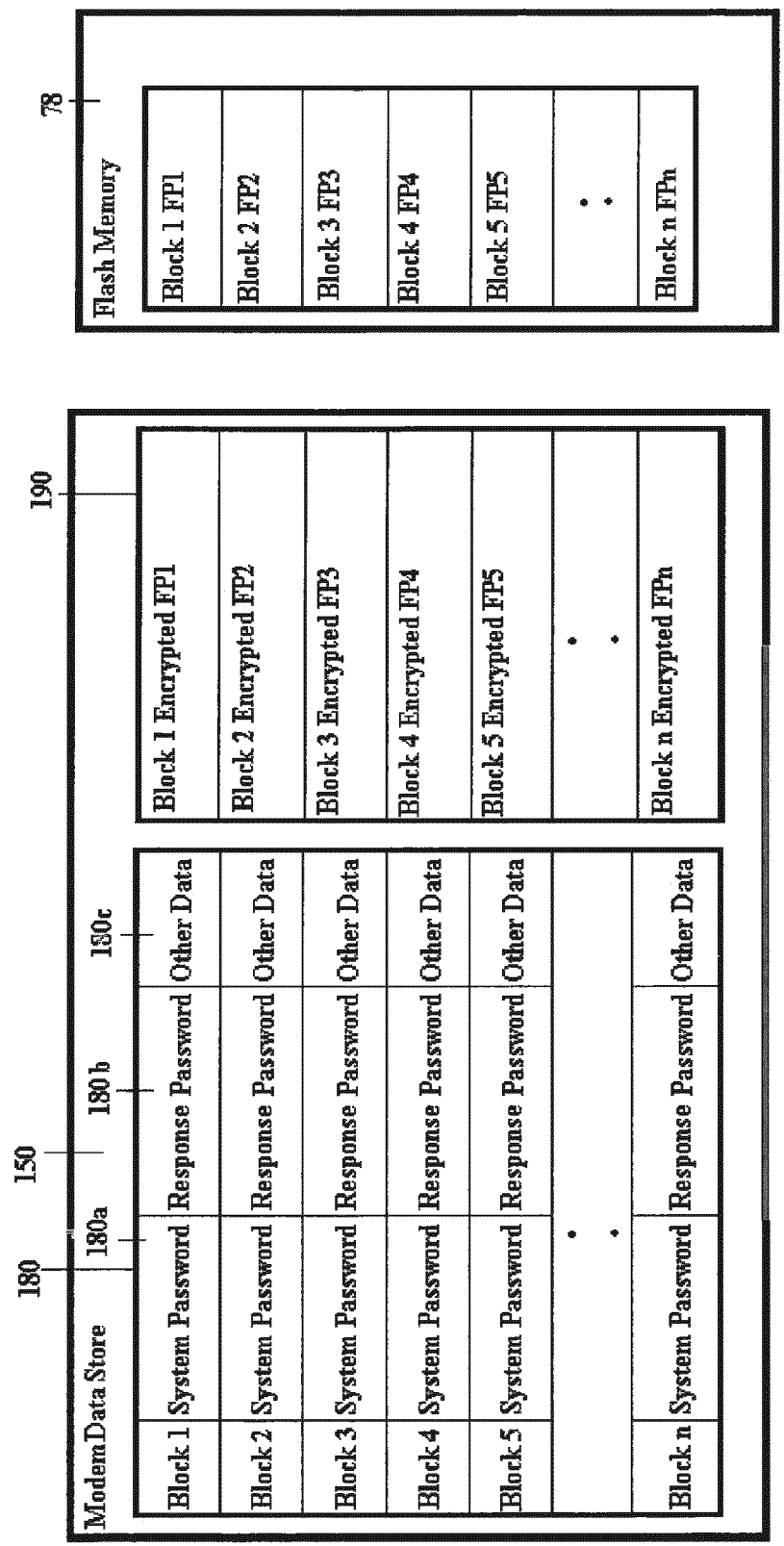
FIG. 5 is a block diagram showing the contents of a data store included in the modem of FIG. 4 and of a flash memory provided on the card shown in FIG. 2.

With Reference to FIG. 5, the data store 150 comprises a data register 180 which is divided into a number of data blocks indicated as Block 1 to Block n each of which is for storing data related to a different type of transaction that the system 2 is operable to perform. By way of example the data in Blocks 1 to 5 may relate respectively to transactions by a particular bank, American Express transactions, Visa transactions, transactions in a particular loyalty scheme and pension benefits transactions. In this embodiment, therefore, each of the data Blocks 1 to n in register 180 corresponds to a respective different one of the authentication modules or, expressed differently, corresponds to a respective different service or type of transaction with which the verification device 10 may be used.

Each of the Blocks 1 to n in data register 180 has a field 180a for storing the system password of the corresponding authentication module i.e. the system password stored in store 114 thereof. Accordingly, the system password which is stored in different ones of the Blocks 1 to n will be the same as, or different from, each other dependent upon whether the authentication modules all use the same system password or whether different authentication modules use different system passwords, as described above.

Each Block 1 to n in data register 180 also has a field 180b for storing the response password of the device 10 as registered in the device database 110 of the corresponding authentication module, i.e. the response password stored in each of Blocks 1 to n is the same as the response password stored in the field 116c of the record 116 that corresponds to the user to whom the respective device 10 is registered. However, the response passwords stored in different ones of the Blocks 1 to n may be different from each other because the same device 10 may be registered in the device databases 110 of each of a number of different authentication modules, and different authentication modules may use different response passwords for the same device 10, as already described above.

In addition, each of Blocks 1 to n in the data register 180 has a memory area 180c, which may be of variable size, for storing further data which might be required by different services or organisations, or in relation to different types of transactions or in cases where particular authentication modules might be set up to require additional data to be returned following a successful fingerprint verification process.

Some or all of the data in the data register 180 may be encrypted.

The data store 150 also contains an encrypted fingerprint register 190 which is divided into a number of different blocks which are also labelled as Blocks 1 to n so as to indicate correspondence between the blocks in register 180 and the blocks in register 190. Each of the Blocks 1 to n in register 190 is for containing a respective different encrypted fingerprint template, each of which is to be used in a verification process and each of which may be used for decrypting data from the corresponding block in data register 180. In general, each verification device 10 will be registered to a single user and accordingly the encrypted fingerprint register 190 may be configured for storing up to 10 encrypted fingerprint templates, one for each finger/thumb, so that different fingers/thumbs can be used for obtaining data from the respective different block in data register 180. In cases in which more than 10 data blocks are required in data register 180, one or more of the blocks in encrypted fingerprint register 190 may each correspond to 2 or more data blocks in the register 180.

The flash memory 78 is of conventional construction and is used for storing unencrypted fingerprint templates generated by the DSP 76 from data received from the fingerprint scanner 74, which is also of conventional construction. The unencrypted fingerprint templates are stored in the flash memory 78 in locations which are also indicated in FIG. 5 as Blocks 1 to n so as to represent correspondence with the Blocks 1 to n of the encrypted fingerprint register 190. The remainder of the flash memory 78 is filled with, or at least partly filled with, "dummy" bytes of data so that it would be impossible, or at least difficult, to determine from a readout of the contents of the flash memory which data represents the unencrypted fingerprint templates. The values of the "dummy bytes" may be generated by a random or pseudo-random number generator. In practice, the flash memory 78 may be completely populated with dummy bytes when formatted prior to use, in which case the dummy bytes would be overwritten in memory locations in which fingerprint templates are stored.

To increase the difficulty in locating the fingerprint templates from a readout of the contents of the flash memory 78, Blocks 1 to n in the flash memory 78 may be in disparate memory locations and the capacity of the flash memory 78 may be substantially greater than that needed for the storage of the data in registers 180 and encrypted fingerprint templates in register 190.

Further, although, for simplicity, each Block in flash memory 78 has been drawn as if the bytes representing each respective fingerprint template are stored in a continuous block of memory locations i.e. in sequential memory positions, this is not essential. For example, for added security each fingerprint template may be broken up into a number of smaller components and the smaller components stored in disparate memory locations.

By way of numerical example, flash memory 78 may have a capacity of 64 kilobytes and each fingerprint template may be made up of 1000 bytes. In light of the above explanation, the 1000 bytes that make up a given fingerprint template may be stored in sequential memory locations or alternatively may be broken up into a number of components and the components stored at disparate memory locations. For example, each component may consist of a single byte in which case the template would be stored in 1000 disparate one byte memory locations. Alternatively, each component may consist of two or more bytes, and all of the components may be made up of the same number of bytes or different components could be made up of different numbers of bytes.

Enrolment Process

In response to receipt by modem 68 of an SMS message containing an enrolment command, the card enrol module 152 of the modem is called into operation. This causes the LED 88 (preferably blue) to be energised and causes the DSP communications manager 170 to send a command to the DSP 76 to initiate a fingerprint reading operation utilising the fingerprint scanner 74.

The fingerprint scanner 74 is conventional and the DSP 76 is a conventional integrated circuit chip programmed in a conventional manner for deriving fingerprint templates from the data provided by the scanner 74 and storing the resulting templates in the flash memory 78. As is well known, a fingerprint template is a set of digital data representing or derived from the minutiae in fingerprints in such a way as to uniquely or substantially uniquely represent the fingerprint in a dataset of modest size. In practice, each template which is stored is based upon an average of a number of scans of the same finger, for example three scans. The DSP 76 and fingerprint scanner 74 are arranged to function accordingly and, thus, following detection in a conventional manner of a finger placed upon the fingerprint scanner 74, the scanner 74 performs the required number of scans and the DSP 76 computes an averaged fingerprint template and stores it in the flash memory 78. Assuming that this is the first enrolment, for simplicity of description it will be assumed that this fingerprint template is stored in Block 1 in the flash memory as unencrypted fingerprint template FP 1.

The card enrol module 152 thereafter calls into operation the encryption key generator 162 which derives an encryption key from the unencrypted fingerprint template FP 1. The algorithm for generating the encryption key may be any suitable known algorithm. Using the encryption key so derived, the encryptor 164 encrypts the averaged fingerprint template FP 1 and stores the result in Block 1 of the encrypted fingerprint register 190. The encryption algorithm executed by encryptor 164 may be any suitable known encryption algorithm.

As already described above, the SMS message containing the enrol command also includes the system password of the authentication module requesting the enrolment and the response password from the relevant record 116 of that authentication module. In this embodiment, it will be assumed that the system password is stored in unencrypted form in field 180*a* of the relevant Block in register 180, but that the encryptor 164 encrypts the response password using the same encryption key and same encryption algorithm as used for encrypting the averaged fingerprint template and that the resulting encrypted response password in field 180*b* of Block 1 of data register 180. In other embodiments, the system password might also be encrypted in the same way for storage in field 180*a*.

Following successful completion of the enrolment process, the card enrolment module 152 causes the green LED 90 to be illuminated. If it is unsuccessful the red LED 92 will be illuminated and the enrolment process can be initiated again. If several attempts at enrolment fail, then the operator of the system may investigate the cause of the error.

Subsequent enrolment processes for enrolling the same device 10 for the performance of authentication processes by different ones of the authentication modules are performed in a similar manner. However, the user selects a different finger for each successive enrolment process and the data derived from each successive process is stored in each successive Block respectively in the flash memory 78, the encrypted fingerprint register 190 and the data register 180. Hence, the user of the device 10 will use a different finger/thumb for the verification processes performed by the different authentication modules, as already mentioned.

Verification Process

Following enrolment, the device 10 may be used in a verification process for verifying the identity of the individual requesting the relevant transaction.

In response to the modem 68 receiving an SMS message 118 (FIG. 3) containing an identify user command, the verify fingerprint module 156 is called into operation. The verify fingerprint module 156 firstly checks the system password contained in the received SMS message 118 against the system passwords stored in register 180, assuming that those stored system passwords are in unencrypted form. If a match is not found, this indicates that the SMS message 118 is not valid and the verify fingerprint module 156 terminates the processing.

If a match between the system password in the received SMS message 118 and one of the system password stored in register 180 is found, the received SMS message 118 is taken to be valid and the verify fingerprint module 156 causes the blue LED 88 to be illuminated to indicate to the user that the device 10 is about to perform a fingerprint reading process. The person requesting the transaction will know which transaction he is requesting and, if he is also the person to whom one of the devices 10 is registered, he will know which finger he presented to the fingerprint scanner 74 when enrolling the device in respect of each of the relevant transactions. Thus, upon illumination of the blue LED 88, the user of the device 10 will, if he/she is the person requesting the transaction, place the appropriate finger or thumb on the fingerprint scanner 74.

In response to this, and an appropriate command from the verify fingerprint module 156, the DSP 76 will derive an averaged fingerprint template, using the same process as described previously.

As is well known, it is unlikely that any two scans of the same fingerprint by a fingerprint reader will produce identical fingerprint data, for example because the user may apply different pressure through his finger thereby distorting the shape of his finger differently, the angle at which his finger is positioned may differ or there may be damage to the skin of his finger that was or was not present for both of the scans. As a consequence, it is unlikely that any two fingerprint templates derived from the same finger will be the same or that any two averaged fingerprint templates derived from the same finger will be the same. However, the averaged fingerprint templates will be sufficiently similar to enable the newly derived averaged fingerprint template to be matched to the fingerprint template stored in the flash memory 78 in the enrolment process.

Accordingly, in a conventional manner, the DSP 76 searches the flash memory 78 for a match to the newly derived averaged fingerprint template. If it does not find a match, DSP 76 sends a signal indicating this to the modem 68 and the verify fingerprint module terminates the process at that point. As a result, an SMS message 120 (FIG. 3) will not be returned to the authentication module and the authentication module will indicate to the respective transaction processor that the verification process has failed. In those circumstances the transaction may not be authorised.

Accordingly, in a conventional manner, the DSP 76 searches the flash memory 78 for a match to the newly derived averaged fingerprint template. In so doing, the DSP 76 may limit its search to the specific address locations in flash memory 78 in which fingerprint templates have been stored in the enrolment processes. Alternatively, this search may be conducted through the whole of flash memory 78. In embodiments in which, as previously described, each fingerprint template is broken up into components which are stored in disparate locations, the DSP 76 may reassemble each template from its components in order to enable matching process to take place, or alternatively it may compare the newly derived averaged fingerprint template component by component with the components of each previously stored template until a match is found.

If the DSP 76 finds a match between the newly derived averaged fingerprint template and a previously stored template in the flash memory 78, the DSP 76 sends a message indicating this to the modem 68, in response to which the modem 68 may construct and send an SMS message 120

(FIG. 3) back to the relevant authentication module. This SMS message must, as previously explained, contain the appropriate response password. However, the response passwords are stored in encrypted form in the respective Block 1 to n of data register 180. Accordingly, before the return SMS message 120 can be constructed it is necessary to decrypt the relevant response password and any further encrypted data which is to be returned in the SMS message 120.

The encryption key derived from the averaged fingerprint template in the enrolment process is not saved, for security reasons. Consequently it is necessary to derive a new and identical encryption key in order to decrypt the data in the data register 180. Whilst the newly derived averaged fingerprint template is sufficiently similar to the previously stored fingerprint template in the flash memory 78 to enable matching to take place for the purpose of verifying the fingerprint, it is not, as is well known, sufficiently similar to enable an identical encryption key to be derived.

Thus, in the present embodiment, the previously stored fingerprint template in flash memory 78 which has been found to match the newly derived averaged fingerprint template is accessed by the verify fingerprint module 156 which then causes the key generator 162 to generate a new encryption key derived from the previously stored fingerprint template in the flash memory 78. Since this is the same as the fingerprint template used to derive the encryption key in the enrolment process, the newly derived encryption key will be identical and is used by the decryptor 166 to decrypt the response password stored in the relevant block 1 to n of data register 180 so that the decrypted response password may be inserted into the return SMS 120.

However, before carrying out this process and as a double security check, the previously stored fingerprint template is also encrypted with the newly derived encryption key and, utilising compare module 168, it is compared with encrypted fingerprint templates stored in the Blocks 1 to n of the encrypted template register 190, to determine if a match can be found. If a match is found, the verify fingerprint module 156 instructs the SMS assembler 148 to assemble the SMS message 120 and transmit it to authentication module from which the received SMS message 118 originated. As an alternative to this process, the newly derived encryption key may be used to decrypt the encrypted fingerprint template in the appropriate block in register 190 and the comparator 168 used to compare this decrypted fingerprint template with the averaged fingerprint template which is stored in flash memory 78 and has been identified by the DSP 76 during the verification process.

In either case, if the comparator 168 does not find a match in the encrypted fingerprint register 190, the verification process is terminated and the red LED 92 illuminated to indicate failure of the verification process. As a result, no SMS message will be returned to the authentication module, and the response processor thereof will send a message to the relevant transaction module indicating that the verification process has failed.

If the comparator 168 does find a match, the green LED 90 is illuminated to indicate this and an SMS message 120 is assembled by the SMS assembler 148 in the modem and returned to the relevant authentication module utilising the origin phone number in the received SMS message 118. The response processor in the authentication module will indicate to the relevant transaction module that the verification process has been successful.

Create Database

When the modem 68 receives an SMS message 118 containing a create database command, as previously described, the store data module 154 of the modem is called into operation.

Using the system password in the received email, the stored data module 154 identifies the Block of register 180 into which the data contained in the received SMS message is to be inserted. However, before storing that data, the store data module 154 causes the fingerprint scanner 74 and DSP 76 to carry out a fingerprint verification process as previously described. This process includes the derivation of a new encryption key from the previously stored averaged fingerprint template in the flash memory 78. This newly derived encryption key is used as previously described to double check the verification utilising the encrypted fingerprint templates stored in register 190. If the data to be stored in data register 182 is to be encrypted, the newly derived encrypted key is used for this purpose with the same encryption algorithm as referred to above.

Remove User

In response to receiving an SMS message 118 containing a remove user command, the remove user module 126 is called into operation. This again carries out a similar fingerprint verification process and if this is successful the relevant data is removed from register 180. The remove user module 126 may be arranged either to remove all data from the register 180 and the register 190, and all prestored averaged fingerprint templates from the flash memory 78. Alternatively, it may be arranged so that it only removes a selected block or blocks of data from the register 180 and 190 and the corresponding prestored averaged fingerprint template or templates from the flash memory 78.

Current Booster

As explained above, each verification device 10 is, in this embodiment, constructed as a slim card which can easily be carried in a wallet, in particular it is intolerable for the device to be a card of generally similar size, shape and thickness to a conventional credit card or the like. As a result, there is limited space available for a battery. The smaller the physical size of the battery, the less capacity it has and the shorter will be the period for which it can supply adequate power before requiring recharging. In order to extend this period, each device 10 preferably includes a current booster as shown in the circuit diagram of FIG. 6.

Figure 6:
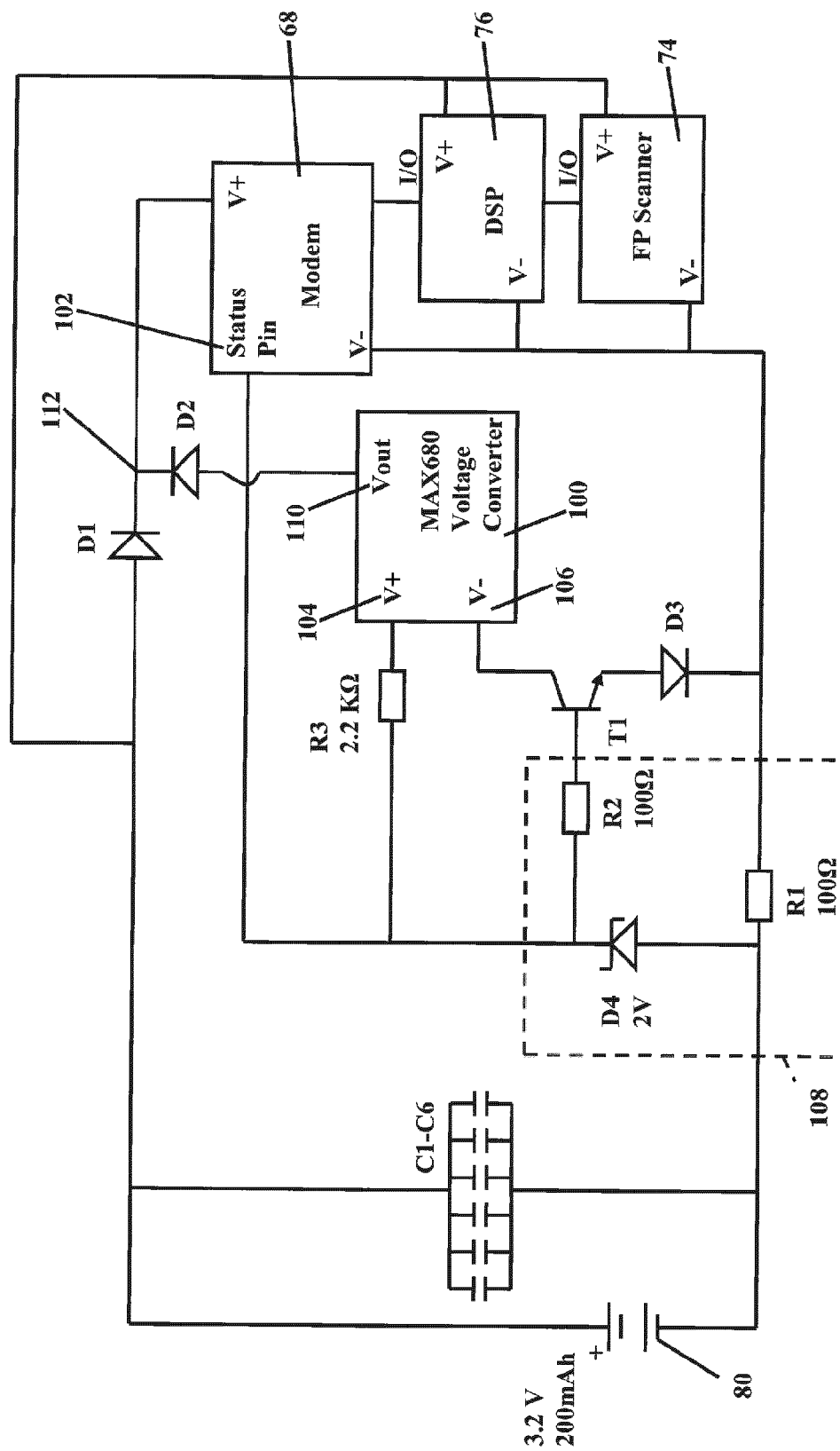
FIG. 6 is a circuit diagram of a current booster circuit which may be included in the card shown in FIG. 2.

As shown in FIG. 6, the positive terminal of the battery 80 is connected through a diode D1 to the positive power supply terminal V+ of each of the modem 68, the DSP 76 and the fingerprint scanner 74. The negative power supply terminal V− and the negative terminal of the battery 80 are connected to ground. A bank of 100 µF smoothing capacitors C1 to C6 is connected across the battery, the capacitors C1 to C6 being in parallel with each other.

To keep the battery as physically small as possible, it may, on its own, only be able to provide sufficient current to the modem 68 for the modem 68 to remain in communication with a base station of the cellular network, after communication with the base station has been established. However, GSM or cell phone modems typically require more current when searching for a base station, and the battery 80 may be insufficient on its own to provide this.

To enable battery 80 which, due to its small size and rating, would not deliver sufficient current on its own to power the modem 68 when the modem 68 is searching for a base station, a current booster circuit 100 is included and this is switched into operation when the modem 68 is searching for a base station and is switched off during periods when the modem has found and is in communication with a base station.

Conventional GSM or cell phone modems such as modem 68 are provided with a status pin, indicated at 102 in FIG. 6 which are at a relatively high voltage, typically about 3V, when the modem is already in communication with a base station, but the voltage of the status pin drops, typically to approximately 2 volts when the modem is searching for a base station. Conventionally, the voltage on the status pin is used to activate an indicator on the cell phone display to indicate whether or not the modem is in communication with a base station.

In the circuit of FIG. 6, the voltage on the status pin 102 is used for two purposes. Firstly, it is used for switching the current booster into and out of operation. Secondly, it is used to provide an input voltage to the current booster 100 from which additional current is generated for supply to the modem 68 when it is searching for a base station.

Thus, current booster circuit 100 has its positive power input terminal 104 connected through resistor R3 to the status pin 102 and its negative power input terminal 106 connected via NPN transistor T1 to ground through a diode D3. The transistor T1 acts as a switch so that the current booster 100 is powered down (switched off) when the status pin voltage is high, but is powered up (switched on) when the status pin voltage is low. For this purpose, a voltage sensing circuit 108 senses the voltage on the status pin 102 and turns the transistor T1 on or off accordingly.

As can be seen in FIG. 6, the sensing circuit includes a resistor R2 through which the status pin 102 is connected to the base of transistor T1, and the Zener diode D4 in series with a resistor R1 through which the status pin 102 is connected to ground. The breakdown voltage of the Zener diode D4 is approximately 2V so that when the status pin voltage is high the Zener diode D4 conducts and the NPN transistor T1 is turned off. When the status pin voltage goes low, such that the Zener diode D4 ceases to conduct, current flows into the base of the NPN transistor T1 from the status pin causing the NPN transistor T1 to be turned on T1.

When the transistor T1 turns on, power is supplied to the power input terminals 104 and 106 of the current booster 100 which then supplies current from its output terminal 110 through diode D2 to the V+ input terminal of the modem 68. The currents through the diodes D1 and D2 are summed at junction 112.

Thus, when the modem 68 is already in communication with a base station and requires a relatively low level of current to power it, this is supplied from the battery 80 via diode D1. When the modem 68 is searching for a base station and requires additional current, this is supplied from the current booster 100 via the diode D2.

The current booster circuit 100 may be a conventional voltage converter operable to approximately double an applied input voltage, such as MAX 680, as indicated in FIG. 6. Thus, in the circuit as shown in FIG. 6, when the current booster circuit 100 is turned on it produces, from the approximate 2 volts applied to it from the status pin 102, a voltage of approximately 4 V which in turn provides the additional current supplied to the modem 68 through the diode D2.

By way of example, the battery may be rated at, say, 3.2 V or 3.5 V and 200 mA hours and the resisters may have the values shown on FIG. 6. However, these are mere examples and in practice values will be chosen to suit the particular components which are used in the verification device 10.

Modifications

Although FIG. 6 shows the details of the particular circuit for providing this additional current, at the circuits are possible. Thus, this aspect of the invention extends to different forms of circuit which, in response to the modem being in a condition in which it is searching for a base station, supplies additional current to the modem. Accordingly, with such an arrangement, it is possible to use a small battery of low rating for powering the modem and other circuitry on the device 10.

Further, although in the embodiment described and illustrated in the accompanying drawings the current booster is shown as applied to a verification device in the form of a card, it may alternatively be applied to any device utilising a modem for communication with a mobile telephone or cell phone network, particularly where the device is such that it is desirable to employ a battery which is a small as possible. Examples of such other devices are mobile telephones themselves.

Further, although one particular circuit has been illustrated in FIG. 6, other forms of circuit are possible, particularly any circuit comprising a battery, a modem status detection circuit for detecting whether the modem is in communication with a base station or is searching for a base station, a current or voltage booster, and a switching circuit controlled by the detection circuit for switching the current or voltage booster into and out of operation such that the booster provides additional current to the modem when it is searching for a base station.

Although the embodiment of the invention described with reference to the drawings incorporates a fingerprint scanner for verifying the identity of the user, alternative embodiments of the invention may employ other forms of biometric sensor, such as an iris sensor.

Although in the embodiment illustrated in the drawings, the device database 110 is provided in the authentication module in each different server, the device database could be incorporated into the conventional database or databases (for example databases 45, 52, 60 and 55 shown in FIG. 1) that contain details of smart cards or other devices with which the verification devices are to be used.

Although in the embodiment described with reference to the drawings the response to a successful verification by a verification device 10 is transmitted back to the telephone number of the server which initiated the verification process, this is not essential. Alternatively, it would be possible to include in the SMS message 118 and alternative telephone number to which the response should be transmitted or each verification device could store the telephone number or numbers to which responses have to be transmitted. There could be a different telephone number to which the responses would be transmitted corresponding to each of the Blocks 1 to n.

Although, in the embodiment described with reference to and as illustrated in the drawings, the verification, encryption and decryption processes have all taken place on the device in the form of a card similar to a conventional credit card, this feature of the invention is also applicable to other forms of device or system. For example, the functionality described with reference to FIGS. 4 and 5 could be provided on some other type of device which incorporates a fingerprint reader, such as a computer or a mobile telecommunications device, for example a smart phone or tablet computer.

Further, although in the illustrated embodiment, the data register's stores 180, 78 and 190 have all been provided on the card itself, other arrangements are possible particularly if the verification device takes a form other than a card. For example, in a networked system, the unencrypted fingerprint templates which in the embodiment are stored in flash memory 78 could instead be stored on a central server and the processing for fingerprint verification and/or for encryption and decryption of data could be partly done at the central server utilising the unencrypted fingerprint templates stored thereat.

It should also be understood that the process of encrypting and decrypting data which has been described, in which unencrypted fingerprint template data is stored in a memory containing a substantial number of random data bytes or other data unrelated to the templates, and the unencrypted fingerprint template data is used for regeneration of an encryption or decryption key, may be used in any encryption and decryption system which utilises an encryption and/or decryption key derived from the fingerprint template.

Architectures for the card and its components which differ from that shown in the accompanying drawings are possible. For example, the digital signal processor and fingerprint scanner could be incorporated into a single integrated unit.

As previously explained, the invention has wide application. It may be used for a large number of different purposes, in particular in relation to a large number of different situations in which different types of electronic transaction will take place. Examples transactions and purposes for which the invention may be used are as follows:

POS/ATM Transactions
Building Security
Driver's License
Airport ID/Access
Hotel Room Access and Billing
Hospital
On line Gaming
Downloaded entertainment
Download Documents
Credit Rating
Birth Certificate
Computer Access/Login
Electronic Wallet
Emergency Medical Information
Other Licenses
Government & Military Facility Access
Medical care
Membership Cards (clubs)
Loyalty Cards (airmiles)
Verification of Deliveries
Benefits Card
Parking Access
Passport
Port ID/Access
Proof of Insurance/Policy
Social Security Card
Visa or Entry/Exit of a border
Voter Registration Card
Food Stamp Card A separate enrolment process may take place in relation to each purpose for which the card is to be used.

Although, the identification requesting computer 26, computer 20, local computer 18, 36, 40, remote computer 51, vendor server 48, bank server 43, identification server 50 and building management server 58 are each illustrated in the accompanying drawings as one computer, they may alternatively each be implemented as a number of computers. If more than one computer they may be connected in a computer network. A computer may be of any one or more of a number of types such as a desktop computer, a laptop computer, a netbook computer, a handheld computer, a tablet computer, a notebook computer, a personal digital assistant (PDA), a server, a workstation, a cellular telephone, a smartphone, a mobile computing device, an Internet appliance, a point-to-point (PtP) network of bus agents, such as microprocessors, that communicate via bus signals dedicated to each agent on the PtP network or any other type of computing device.

In the following claims, the word "finger" is used to be generic to both fingers and thumbs.

A number of further aspects of the invention are defined in the following clauses A to H.

A. A verification device comprising a cellular telecommunications modem and a fingerprint scanner coupled to the modem, the verification device being configured for storing first fingerprint data in an enrolment process and being operable, in response to the modem receiving a verification command via a cellular telecommunications network, to perform a verification process in which:
(a) the fingerprint scanner scans a fingerprint to obtain second fingerprint data,
(b) the first and second fingerprint data are compared with each other, and
(c) in the event of a match between the first and second fingerprint data, the modem transmits a response signal to a predetermined destination via the telecommunications network.

B. A telecommunications network system for performing an electronic transaction or process comprising:
one or more terminals operable for initiating the electronic transaction or process;
a plurality of verification devices according to any preceding claim;
means for transmitting, via a cellular telecommunications network, a verification command to a said verification device in response to initiation of a transaction or process by a said terminal;
means for receiving a said response signal via a cellular telecommunications network; and
means for performing said transaction or process only if said receiving means receives a said response signal.

C. A verification device comprising a cellular telecommunications modem and a biometric sensor coupled to the modem, the verification device being configured for storing first biometric data in an enrolment process and being operable, in response to the modem receiving a verification command via a cellular telecommunications network, to perform a verification process in which:
(a) the biometric sensor obtains second biometric data,
(b) the first and second biometric data are compared with each other, and
(c) in the event of a match between the first and second biometric data, the modem transmits a response signal to a predetermined destination via the telecommunications network.

D. A cellular telecommunications device comprising a modem and a power supply circuit, said power supply circuit including a current booster which is rendered operable in response to the modem searching for a base station and inoperable when the modem is in communication with a base station, so that additional current is supplied to the modem when searching for a base station.

E. An identity verification device comprising a biometric sensor and a cellular telecommunications device according to clause D, the verification device being operable for performing identity verification operations utilising the biometric sensor in response to receipt of a verification command via a cellular telecommunications network.

F. A cellular telecommunications device comprising a modem and a power supply circuit, said power supply circuit including terminals for connection to a battery, a modem status detection circuit for detecting whether the modem is in communication with a base station or is searching for a base station, a current or voltage booster, and a switching circuit controlled by the detection circuit for switching the current or voltage booster into and out of operation such that the booster provides additional current to the modem when it is searching for a base station.

G. A verification device which incorporates a fingerprint reader and is operable to perform an encryption process in which an item of electronic information is encrypted and stored on the card and a decryption process in which the stored information is decrypted, and in which (a) the encryption is performed by
  (i) deriving a first fingerprint template from a finger,
  (ii) storing the first fingerprint template in unencrypted form in a memory which also contains other data values thereby to conceal the first fingerprint template,
  (iii) deriving an encryption key from the first fingerprint template, and
  (iv) encrypting said information by any encryption algorithm which utilises said encryption key;
(b) and decryption is performed by
  (i) deriving a second fingerprint template from a finger,
  (ii) performing a matching process to match the second fingerprint template with the stored first fingerprint template,
  (iii) if the matching process is successful, regenerating the encryption key from the first fingerprint template, and
  (iv) decrypting the encrypted information utilising the regenerated encryption key.

H. An electronic process for encrypting and decrypting information in electronic form in which:
(a) encryption is performed by
  (i) deriving a first fingerprint template from the finger,
  (ii) storing the first fingerprint template in unencrypted form in a memory which also contains other data values thereby to conceal the first fingerprint template,
  (iii) deriving a encryption key from the first fingerprint template,
  (iv) encrypting said information by an encryption algorithm which utilises said encryption key, and
  (vi) storing said encrypted information;
(b) and decryption is performed by
  (i) deriving a second fingerprint template,
  (ii) performing a matching process to match the second fingerprint template with the stored first fingerprint template,
  (iii) if the matching process is successful, regenerating the encryption key from the first fingerprint template, and
  (iv) decrypting the encrypted information utilising the regenerated encryption key.

The invention claimed is:

1. A method of authorizing an electronic transaction or process to be performed utilizing an electronic transaction device which cooperates with a terminal apparatus which is responsive to said transaction device for generating instructions for the performance of said electronic transaction or process, the method comprising:
   (a) receiving a verification command at a verification device which comprises a biometric sensor and has first biometric data stored therein, said verification device being separate from said transaction device and said terminal, said verification command being received via a telecommunications network independently of said terminal and said transaction device;
   (b) responsive to receipt of said verification command, performing by the verification device an authentication process which comprises the verification device obtaining, from said biometric sensor, second biometric data and comparing the first and second biometric data with each other; and
   (c) in the event of a match between said first and second biometric data, said verification device generating a response signal indicative of said match and transmitting said response signal, independently of said transaction device and said terminal, to a predetermined destination for authorizing said transaction or process.

2. A method according to claim 1, wherein said verification command is received by said verification device, via a cellular telecommunications network, at a cellular telecommunications modem of said verification device.

3. A method according to claim 1, in which a system password is received by said verification device with said verification command, and said verification device generates said response signal only if a system password stored in the verification device corresponds to the system password received with said command.

4. A method according to claim 3, wherein the verification device includes a response password in said response signal.

5. A, method according to claim 1, in which the biometric sensor is a fingerprint sensor and said first and second biometric data are first and second fingerprint identifying data respectively.

6. A method according to claim 2, wherein the verification command is in an SMS text message.

7. A method according to claim 2, wherein said response signal is transmitted via said cellular telecommunications network in an SMS text message.

* * * * *